US009608711B2

(12) United States Patent
Bellamkonda et al.

(10) Patent No.: US 9,608,711 B2
(45) Date of Patent: Mar. 28, 2017

(54) APPARATUS AND METHODS FOR ANTENNA CORRELATION ESTIMATION IN A MULTI-ANTENNA SYSTEM

(71) Applicant: MOTOROLA MOBILITY LLC, Chicago, IL (US)

(72) Inventors: Krishna K. Bellamkonda, Lake Zurich, IL (US); Eric L. Krenz, Crystal Lake, IL (US); Nischal Y. Patel, Gilberts, IL (US); Brett L. Robertson, Mundelein, IL (US); Istvan J. Szini, Grayslake, IL (US)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 0 days.

(21) Appl. No.: 14/453,686

(22) Filed: Aug. 7, 2014

(65) Prior Publication Data
US 2016/0248496 A1 Aug. 25, 2016

(51) Int. Cl.
*H04B 7/06* (2006.01)
*H04B 7/0413* (2017.01)

(52) U.S. Cl.
CPC ......... *H04B 7/0632* (2013.01); *H04B 7/0413* (2013.01)

(58) Field of Classification Search
CPC .... H04B 7/0619; H04B 7/0626; H04B 17/24; H04B 17/104; H04B 17/309; H04B 7/0452; H04B 7/0617; H04B 7/0632; H04B 7/0413; H04W 52/225
See application file for complete search history.

(56) References Cited

U.S. PATENT DOCUMENTS

| 7,974,359 | B2 | 7/2011 | Gorokhov et al. |
| 8,144,797 | B2 | 3/2012 | Mujtaba et al. |
| 2012/0213113 | A1* | 8/2012 | Zhao ............ H04B 7/0626 370/252 |
| 2013/0322562 | A1 | 12/2013 | Zhang et al. |

OTHER PUBLICATIONS

3GPP TS 36.213 V12.1.0 (Mar. 2014); 3rd Generation Partnership Project; Technical Specification Group Radio Access Network; Evolved Universal Terrestrial Radio Access (E-UTRA); Physical layer procedures (Release 12) (2014), section 7.2.3 "Channel Quality Indicator (CQI) defintiion" pp. 81-85.

* cited by examiner

*Primary Examiner* — Vineeta Panwalkar
(74) *Attorney, Agent, or Firm* — Morris & Kamlay LLP

(57) ABSTRACT

Disclosed apparatuses obtain real-time performance measurements and adaptively select multiple-input, multiple-output (MIMO) antennas to improve MIMO antenna performance. A correlation estimator determines an approximation of instantaneous antenna correlation values. One method includes obtaining a channel quality indicator (CQI) measurement for first and second antennas of a mobile device. The method determines a composite CQI for the two antennas and estimates the antenna correlation for the first and second antennas based on the composite CQI. The method can include performing a lookup operation in a CQI table mapping composite CQI to coding rates. The method can include obtaining a signal-to-noise ratio (SNR) measurement for the first and second antennas of the mobile device, and estimating the antenna correlation for the first and second antennas based on the composite CQI and the SNR measurement.

19 Claims, 9 Drawing Sheets

| SNR-Quantization | Ant_Corr=0.1 | Ant_Corr=0.2 | Ant_Corr=0.3 | Ant_Corr=0.4 | Ant_Corr=0.5 | Ant_Corr=0.6 | Ant_Corr=0.7 | Ant_Corr=0.8 | Ant_Corr=Ant_Corr=0.9 |
|---|---|---|---|---|---|---|---|---|---|
| Level 1 (-2 dB to 4 dB) | 100 | 98.36 | 96.53 | 94.79 | 93.06 | 92.59 | 92.13 | 91.67 | 91.67 |
| Level 2 (4 dB to 6 dB) | 100 | 98.75 | 97.5 | 96.25 | 95 | 94.67 | 94.33 | 94 | 94 |
| Level 3 (6 dB to 8 dB) | 100 | 96.69 | 93.38 | 90.07 | 86.76 | 85.05 | 83.33 | 81.62 | 81.62 |
| Level 4 (8 dB to 10 dB) | 100 | 98.91 | 97.83 | 96.74 | 95.65 | 93.1 | 86.54 | 81.99 | 81.99 |
| Level 5 (10 dB to 12 dB) | 100 | 98.52 | 97.04 | 95.56 | 94.09 | 91.58 | 89.07 | 86.56 | 86.56 |
| Level 6 (12 dB to 16 dB) | 100 | 99.17 | 98.35 | 97.52 | 96.7 | 94.34 | 91.98 | 89.62 | 89.62 |

*FIG. 9*

APPARATUS AND METHODS FOR ANTENNA CORRELATION ESTIMATION IN A MULTI-ANTENNA SYSTEM

FIELD OF THE DISCLOSURE

The present disclosure relates generally to antennas and multiple-input, multiple-output (MIMO) antennas systems with diversity reception, and more particularly to mobile devices employing such MIMO antenna systems.

BACKGROUND

Mobile devices may incorporate multiple antennas, or an antenna array, for diversity reception and for implementing spatial multiplexing. Spatial multiplexing involves splitting a high data rate signal into two or more separate data streams that are intended to arrive at a receiver antenna array with different spatial signatures such that the two or more separate data streams can be reassembled to construct the high data rate signal. At least two separate mobile device antennas, or two antenna elements of an antenna array, each receive one of the separate data streams. Therefore, spatial multiplexing may be considered a form of antenna diversity reception.

The goal of antenna diversity reception is to take advantage of decorrelation between the diversity antennas. The decorrelation may be achieved by physical placement, polarization or by using differing antenna beam patterns. Mobile device diversity and MIMO (multiple-input, multiple-output) antenna systems have been developed based on static figure-of-merit ("FoM") requirements, total efficiency, gain imbalance and envelope correlation coefficient values (i.e. antenna correlation) that are fixed regardless of prevalent operating parameters or the environment in which the mobile device is operating.

Performance of the MIMO system may be negatively impacted by changes in the radiated channel conditions and the user's position and handgrip on the mobile device, because the hand position may impair radio frequency (RF) reception by the MIMO antennas. For this and other reasons, challenges exist for achieving good performance of diversity antenna systems in a mobile device.

BRIEF DESCRIPTION OF THE DRAWINGS

FIG. 9 is an example table relating antenna correlation to SNR quantized values.

DETAILED DESCRIPTION

Figure 1:
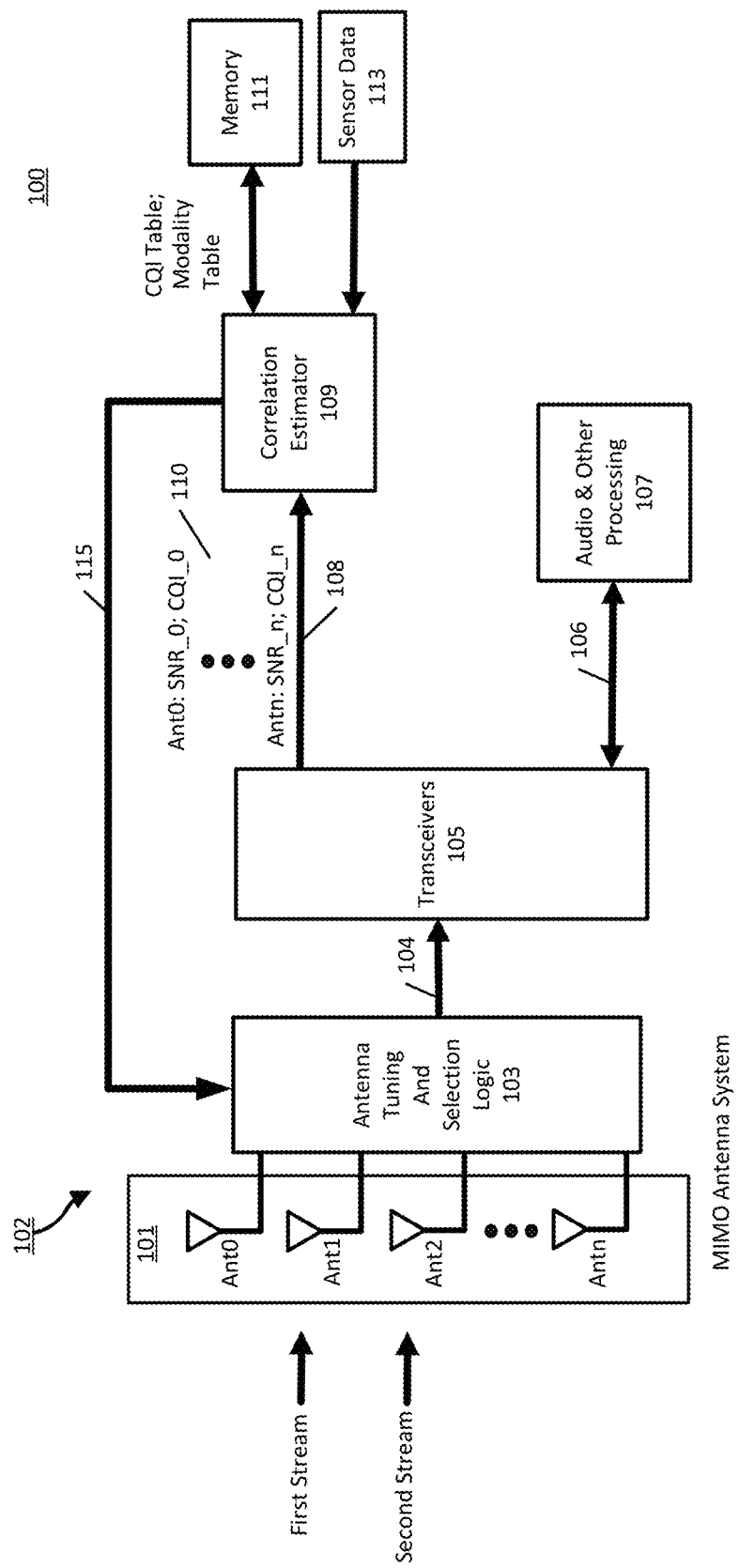
FIG. 1 is a block diagram of an example mobile device having multiple-input/multiple-output antennas (MIMO) and a correlation estimator in accordance with an embodiment.

Briefly, the disclosed embodiments provide apparatuses and methods that obtain real time performance measurements and adaptively select MIMO antennas, in response to the real time performance measurements, to improve MIMO antenna performance under given conditions. In one embodiment, a correlation estimator is operative to determine an approximation of instantaneous antenna correlation values.

One disclosed method of operation includes obtaining a channel quality indicator (CQI) measurement for a first antenna and a second antenna of a mobile device in a MIMO (multiple-input, multiple-output) system. The method proceeds by determining a composite CQI for the two antennas and estimating the antenna correlation for the first antenna and second antenna using the composite CQI. The method may further include performing a table lookup operation in a CQI table. In accordance with the embodiments, the CQI table maps composite CQI including at least a first and second multiple input multiple output (MIMO) stream to coding rates. The method may further include obtaining a signal-to-noise ratio (SNR) measurement for the first antenna and the second antenna of the mobile device, and estimating the antenna correlation for the first antenna and second antenna using the composite CQI and the SNR measurement.

In one embodiment, the method also includes providing a feedback signal to antenna tuning and selection logic based on the estimated antenna correlation. The method may also proceed by switching from the first antenna and the second antenna to a third antenna and a fourth antenna, in response to the antenna correlation estimate for the first antenna and the second antenna. Alternatively, the method may proceed by deactivating the second antenna and activating a third antenna to pair the third antenna with the first antenna, in response to the antenna correlation estimate for the first antenna and the second antenna.

An apparatus is disclosed that includes at least one transceiver, a multi-input multi-output (MIMO) antenna system, and a correlation estimator that is operatively coupled to the at least one transceiver. The correlation estimator is operative to obtain a channel quality indicator (CQI) measurement for a first antenna and a second antenna of the MIMO antenna system, determine a composite CQI for the two antennas and estimate the antenna correlation for the first antenna and second antenna using the composite CQI.

In one embodiment, the apparatus includes non-volatile, non-transitory memory that is operatively coupled to the correlation estimator. The memory stores a CQI table that maps composite CQI including at least a first and second MIMO stream to coding rates. In that embodiment, the correlation estimator is further operative to obtain the antenna correlation estimate by performing a table lookup operation in the CQI table using the composite CQI. The correlation estimator may also obtain a signal-to-noise ratio (SNR) measurement for the first antenna and the second antenna of the mobile device, and estimate the antenna correlation for the first antenna and second antenna using the composite CQI and the SNR measurement.

In one embodiment, the apparatus also includes antenna tuning and selection logic that is operatively coupled to the MIMO antenna system, to the at least one transceiver and to the correlation estimator. In that embodiment, the correlation estimator is further operative to provide a feedback signal to the antenna tuning and selection logic based on the estimated antenna correlation. The antenna tuning and selection logic is operative to switch from the first antenna and the second antenna to a third antenna and a fourth antenna, in response to the feedback signal. The antenna tuning and selection logic is also operative to deactivate the second antenna and activate a third antenna to pair the third antenna with the first antenna, in response to the feedback signal.

The present disclosure also provides a mobile device that includes at least one transceiver, a MIMO antenna system that is operatively coupled to the at least one transceiver, and a CQI table stored in non-volatile, non-transitory memory. The CQI table maps a composite CQI that includes at least a first and second MIMO stream to coding rates. The mobile device also includes a correlation estimator that is operatively coupled to the at least one transceiver and to the memory. The correlation estimator is operative to obtain a CQI measurement for a first antenna and a second antenna of the MIMO antenna system, determine a composite CQI for the two antennas, and estimate the antenna correlation for the first antenna and second antenna using the composite CQI by performing a table lookup operation in the CQI table.

Another disclosed method includes measuring a plurality of antenna pairs having known antenna correlations in a MIMO test chamber, and developing a CQI table mapping composite CQI to MIMO coding rates for each of the antenna pairs. The method may further include developing the CQI table using quantized SNR values and relating the quantized SNR values to CQI and antenna correlation percentages. The method may also include accounting for percentage utilization of dual stream and single stream MIMO transmissions in the composite CQI based on coexistence of dual stream and single stream transmissions. The method also includes storing the CQI table in a non-volatile, non-transitory memory of a mobile device.

Another disclosed method includes detecting that a mobile device has entered a geo-location based on mobile device location information, predicting that the mobile device will have a given antenna correlation by checking historical data related to the geo-location identified by the mobile device location information, and adjusting the mobile device antennas based on the predicted antenna correlation. The method may further include sending location information from the mobile device to a server, and receiving antenna correlation prediction information by the mobile device in response to sending the location information. In some embodiments, the method may also include detecting a modality of the mobile device, and adjusting the mobile device antennas based on the modality in addition to using the predicted antenna correlation.

Turning now to the drawings, FIG. 1 is a block diagram of a mobile device 100 that includes a MIMO antenna system 102. The MIMO antenna system 102 includes antennas 101, which may be an antenna array, that are operatively coupled to antenna tuning and selection logic 103 by RF coupling. The antenna tuning and selection logic 103 is further operatively coupled to one or more transceivers 105 that demodulate received radio frequency (RF) signals 104 for voice and data communication processed by audio and other processing 107. The transceivers 105 are operatively coupled to the audio and other processing 107 for sending and receiving bidirectional data 106 such as full-duplex voice channels, data channels, command and control channels, etc. The MIMO antenna system 102 may be considered to be an adaptive antenna system that may be implemented using, for example, antenna placement switching, parasitic resonators, variable phase shifters, transmission line switching, etc., or any other suitable components as understood by those of ordinary skill.

It is to be understood that "RF coupling" may include, but is not limited to, transmission lines and matching networks as understood by those of ordinary skill. For example, the transmission lines may be implemented using microstrip, stripline or any suitable RF circuit technology as understood by those of ordinary skill and may include transmission line elements such as capacitances or inductances, discrete components, or combinations thereof as needed to implement matching networks between the various components.

The antennas 101 are operative such that at least two antennas (i.e. a MIMO diversity antenna pair) are used to obtain spatially multiplexed signals. That is, as shown in FIG. 1, the antennas 101 are operative to receive a transmission that includes a first stream and a second stream using any combination of two antennas (from antennas Ant0, Ant1, Ant2 through Antn). In a UMTS long term evolution (LTE) system, the first stream and second stream are referred to as layers such that the transmission is a rank 2 transmission based on it having two layers, i.e. the first stream and second stream. Thus for a rank 2 transmission two codewords may be received by the mobile device 100 when a single codeword is mapped to a single layer.

In LTE operation, an open loop feedback system is utilized in which a mobile device calculates CQI based on defined algorithms and based on the rank of the transmission. The CQI information may be sent as feedback to the transmitting base station for further adjustments of the transmitted streams. In accordance with the embodiments, the mobile device 100 includes a correlation estimator 109 that is operatively coupled to the transceivers 105 to obtain signal quality metrics 108 including signal-to-noise-ratio (SNR) and CQI information 110. The correlation estimator 109 uses the SNR and CQI information 110 in conjunction with a CQI table that may be stored in memory 111. Memory 111 is non-volatile, non-transitory memory and is either operatively coupled to the correlation estimator 109 or is integrated into the correlation estimator 109. The correlation estimator 109 is operative to determine an effective SNR and an effective CQI using the SNR and CQI information 110. These values are then used by the correlation estimator 109 to determine a "MIMO conditioner" metric that is used to perform a table lookup operation using the CQI table to obtain a corresponding antenna correlation value. In other words, the correlation estimator 109 is operative to estimate antenna correlation for the operating antennas of antennas 101. This estimated correlation may then be used to generate an appropriate closed loop feedback signal 115 to the antenna tuning and selection logic 103 to improve antenna correlation for the existing transmission being received.

In some embodiments, the memory 111 may also store a modality table. The modality table maps various pretested uses case modalities using antennas of known correlation, such as various handgrips, positions of the mobile device 100 with respect to a user's head, dock mode, concealed mode, etc., so as to map these modalities to changes in SNR and CQI information 110. This mapping may then be used to anticipate antenna correlation changes and adjust accordingly by tuning or by selecting appropriate antenna pairs. For example, the correlation estimator 109 may receive sensor data 113 and use the sensor data 113 to determine the modality. The correlation estimator 109 may then obtain SNR and CQI information from the modality table, and antenna correlation from the CQI table.

The terms "antenna correlation" (also "correlation") and "gain imbalance" are each referred to herein individually as a "figure-of-merit" or as a "figure-of-merit type." In other words, "antenna correlation" is one example of a figure-of-merit or figure-of-merit type and "gain imbalance" is another example of a figure-of-merit or figure-of-merit type. As understood by those of ordinary skill, it is preferable to have low correlation and low gain imbalance however a tradeoff must be made in any design because of limitations related to MIMO antenna system placement, user head and hand effect, mismatch and insertion losses, source-pull complex mismatch, among other design restrictions imposed on a mobile device. The correlation estimator 109 estimates the antennas correlation using a predetermined CQI table and may provide the feedback signal 115 to the antenna tuning and selection logic 103 for the purpose of making adjustments to achieve low antenna correlation to the extent possible.

The terms "high" and "low" as used herein are relative terms that are to be construed such that a given MIMO antenna when paired with another exhibits a "better" (i.e. lower correlation) or "worse" (i.e. higher correlation) performance with respect to another MIMO diversity antenna pairing by comparison of measured performance values between the two antennas or between two different antenna pairs, but irrespective of the actual numerical range of any such measured performance value. More particularly, a MIMO diversity antenna pair exhibiting a "low" correlation is herein considered as exhibiting a "better" correlation than a MIMO diversity antenna pair exhibiting a "high" correlation (i.e. "worse"). A MIMO diversity antenna pair exhibiting a "low" gain imbalance is herein considered as exhibiting a "better" gain imbalance than a MIMO diversity antenna pair exhibiting a "high" gain imbalance (i.e. "worse"). Therefore, by comparison of correlation and gain imbalance measurements for a first MIMO diversity antenna pair and a second MIMO diversity antenna pair, one of the two antenna pairs may be found to have a "high" or "higher" correlation and a "low" or "lower" gain imbalance and the other may be found to have a "low" or "lower" correlation and a "high" or "higher" gain imbalance with respect to each other by the comparison.

Figure 2:
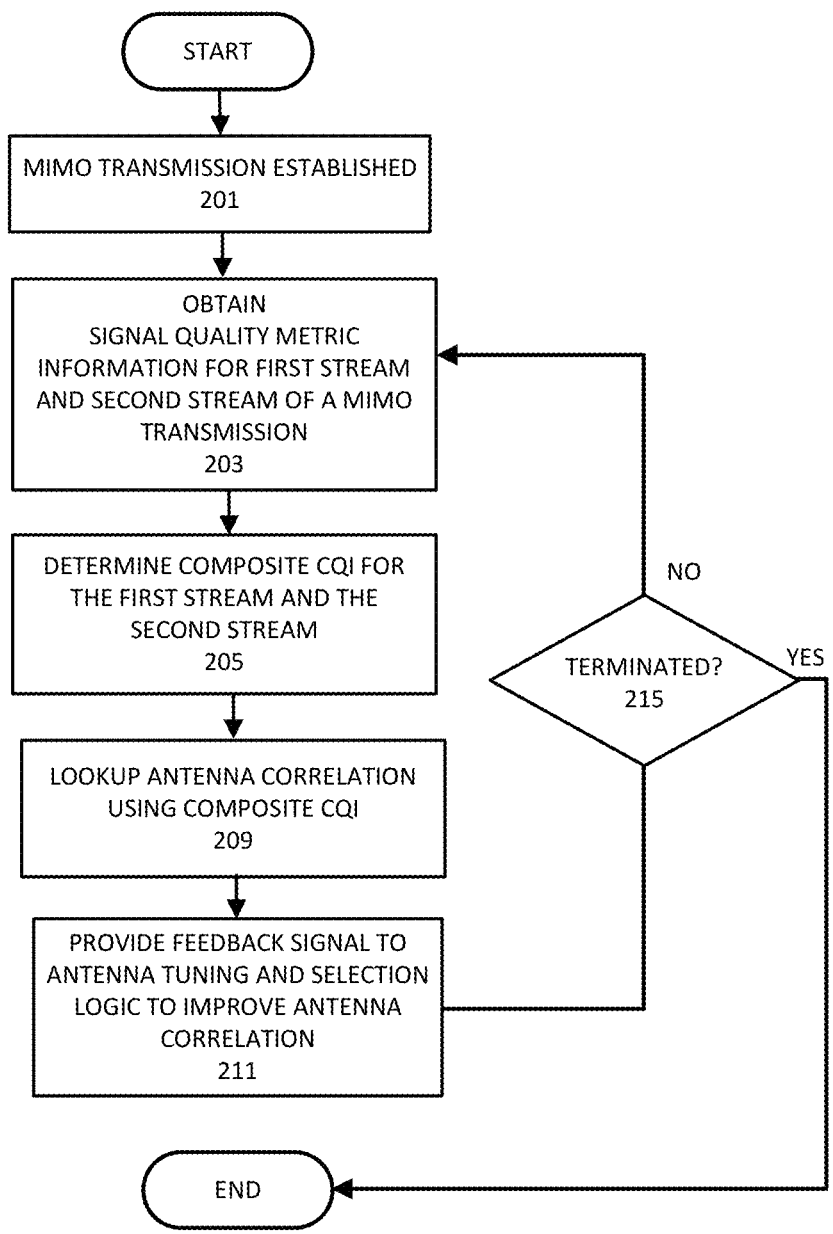
FIG. 2 is a flow chart of an example method of operation of the mobile device shown in FIG. 1 in accordance with an embodiment.

FIG. 2 is a flowchart that illustrates a method of operation of the mobile device 100 in accordance with an embodiment. The method of operation begins and, in operation block 201, a MIMO transmission is established that includes a first stream and a second stream such that it is a rank 2 MIMO transmission. In operation block 203, the correlation estimator 109 obtains signal quality metrics 108 (such as SNR and CQI information 110) from the transceivers 105 for the first stream and for the second stream. Put another way, the signal quality metrics 108 are obtained for a first receiving antenna and a second receiving antenna. In operation block 205, the correlation estimator 109 determines a composite CQI and a percentage utilization of rank 2 transmission by calculating the composite CQI using the SNR and CQI information 110 for each of the two streams. That is, the correlation estimator 109 takes into account a percentage utilization of rank 2 and rank 1 transmissions with respect to the two data streams. The CQI composite is therefore determined using the CQI across both MIMO streams and the MIMO utilization as a percentage of rank 2 and rank 1 utilization. In operation block 209, the correlation estimator 109 accesses a CQI table and performs a table lookup using the composite CQI to obtain an estimated antenna correlation. In accordance with the embodiments, the CQI table is predetermined using empirical data collected from known antennas of known correlation. The CQI table defined by the LTE specifications is modified in the present embodiments to provide a composite CQI metric for a corresponding channel-0 and channel-1 CQI for the two streams. In operation block 211, the estimated correlation may be used to generate a feedback signal 115 to the antenna tuning and selection logic 103 to improve (i.e. lower) the antenna correlation accordingly. The method of operation may continue to loop back to operation block 203 until the MIMO transmission is terminated in decision block 215.

In accordance with the embodiments, the correlation estimator 109 generates a metric referred to herein as the "MIMO conditioner" metric which quantifies the changes in antenna correlation due to changes in the mobile device 100 environment including changes in modality. This metric is generated by using filtered values. The MIMO conditioner metric may be further used to generate the feedback signal 115 to the antenna tuning and selection logic 103.

Figure 6:
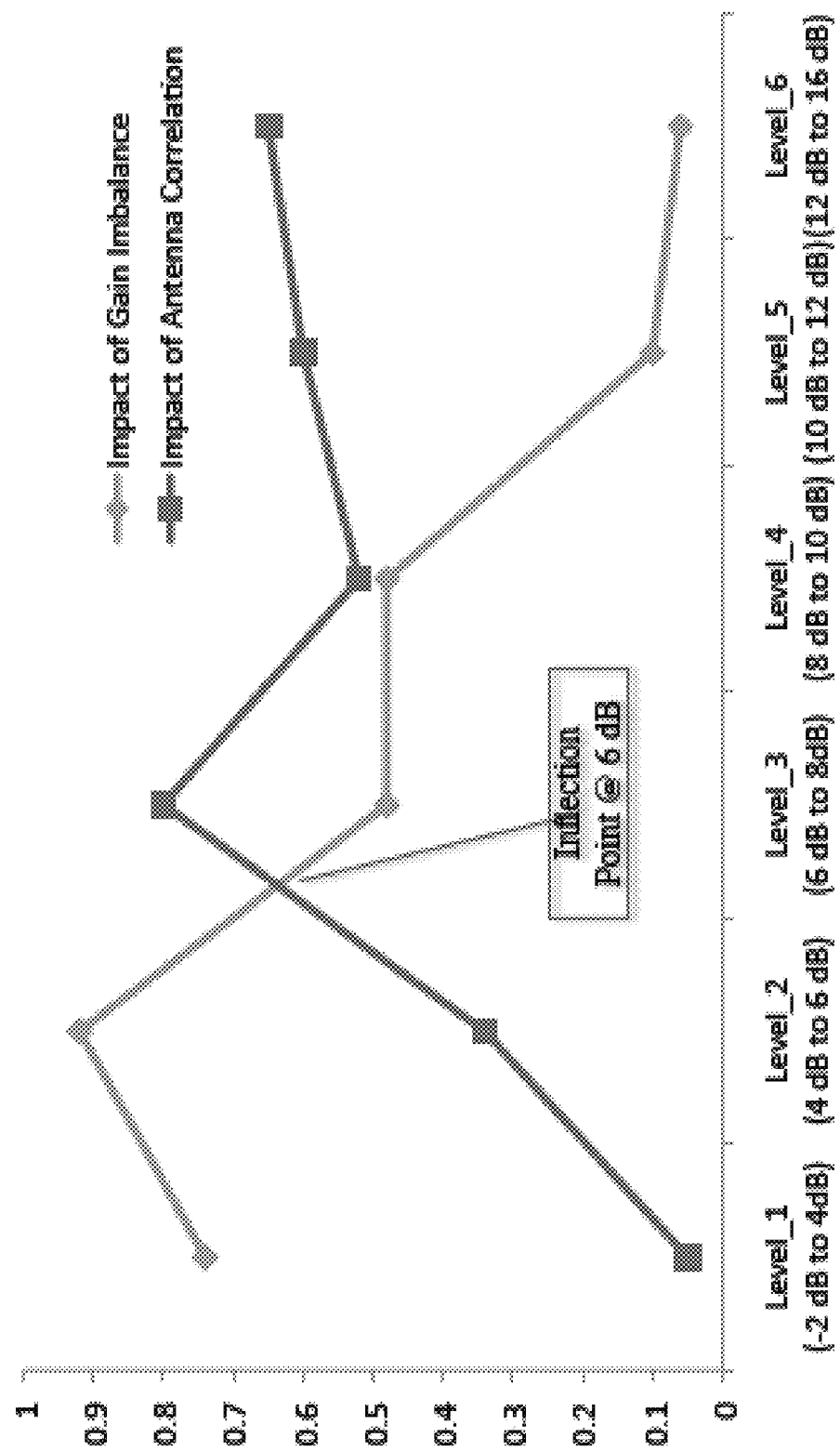
FIG. 6 is an example graph of a relationship that illustrates the impact of gain imbalance and antenna correlation on throughput, versus signal quality as measured by signal-to-noise ratio (SNR) in accordance with various embodiments.
Figure 8:
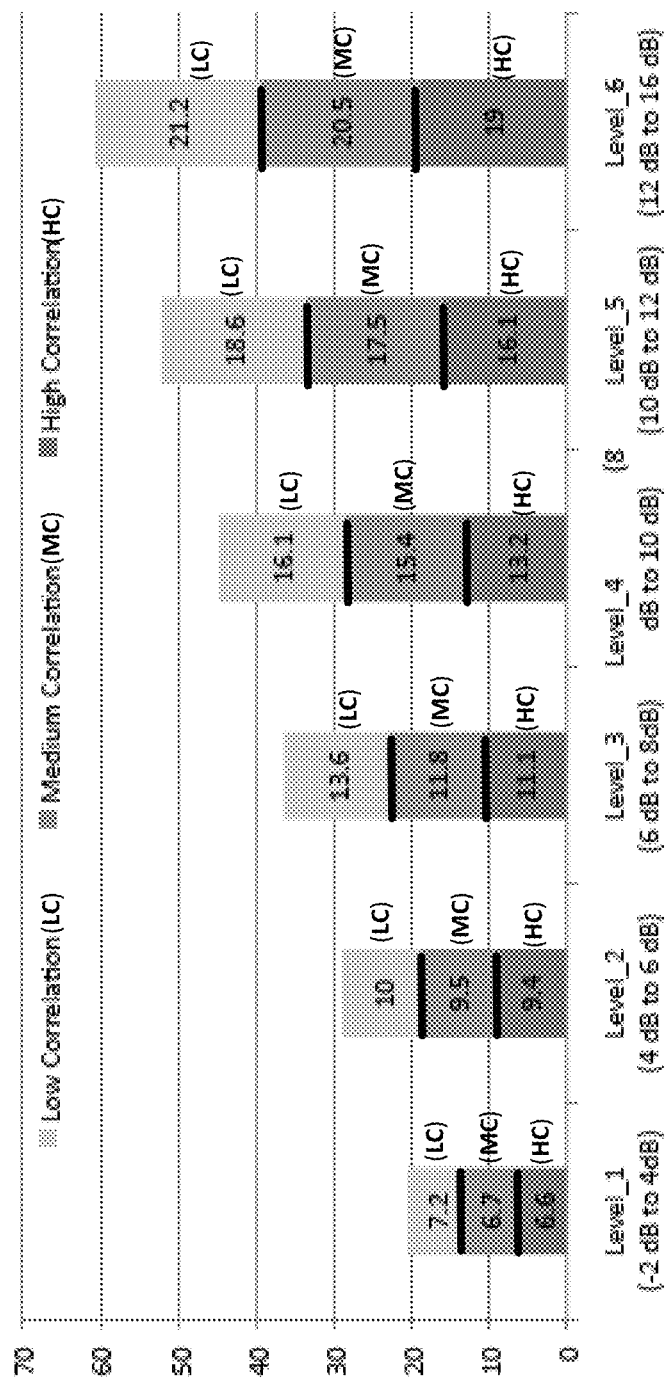
FIG. 8 is a bar chart showing SNR quantization levels with respect to antenna correlation.

The relationships used by the correlation estimator 109 have been determined through empirical measurements. More specifically, various reference antennas with known correlation have been measure in a MIMO test chamber using a channel model reflective of real-world conditions. For example, an employed test environment was Band 13, DL EARFCN-5230 (EUTRA Absolute Radio Frequency Channel) using 3GPP LTE Transmission Mode-4 (Closed Loop Spatial Multiplexing) and using the 3GPP Uma channel model. Various signal levels were then selected as reference points to compare various reference antennas with correlations of 0.1, 0.5 and 0.9. It was found that MIMO performance was highly statistically correlated with SINR and therefore SINR was bucketized/quantized into six levels which are illustrated in FIG. 6, FIG. 8 and FIG. 9. For the test channel model, the maximum observed SINR was approximately 18 dB. For a MIMO spatial multiplexing system, the antenna correlation is important toward determining an overall channel quality score, and CQI takes into account both SINR and antenna correlation. FIG. 6 illustrates that for an antenna system with high efficiency but poor antenna correlation (i.e. high correlation) the gains in SINR do not translate to high CQI.

Figure 7:
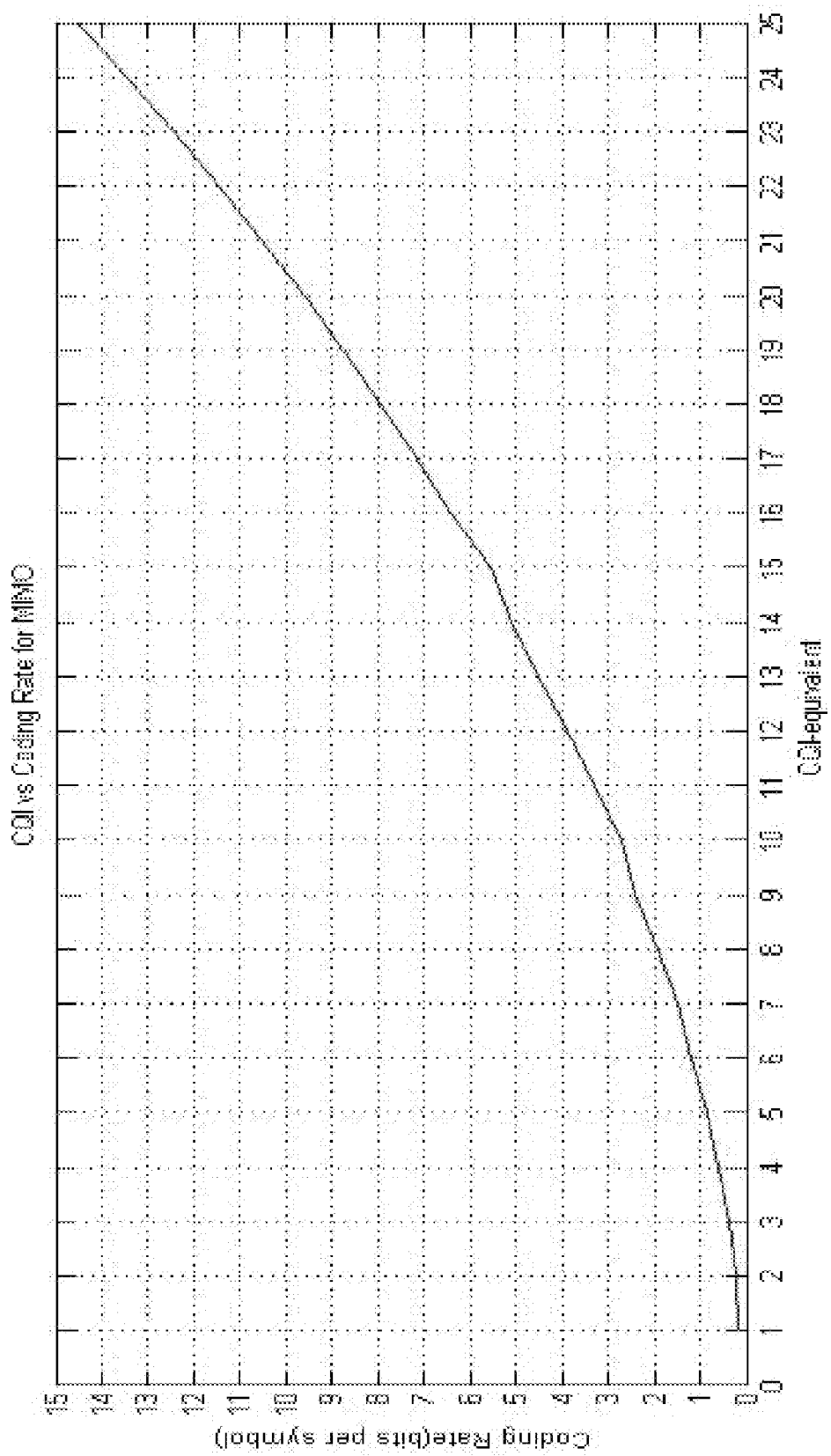
FIG. 7 is a graph of equivalent CQI versus coding rate for a MIMO rank 2 transmission in accordance with the embodiments.

As known by those of ordinary skill, standards map CQI to coding rate. The 3GPP TS 36.213 V12.1.0 (2014-03); 3rd Generation Partnership Project; Technical Specification Group Radio Access Network; Evolved Universal Terrestrial Radio Access (E-UTRA); Physical layer procedures (Release 12) (2014), which is hereby incorporated by reference herein, defines the "Channel Quality Indicator (CQI)" and provides a table mapping CQI index to coding rate for a SISO (Single-Input Single Output) system. In accordance with the embodiments, FIG. 7 is a mapping adapted to a rank 2 MIMO transmission and therefore represents the composite CQI described above. The coding rates translates to throughput in bits-per-symbol (bps). The bar graph in FIG. 8 illustrates percentage antenna correlation based on the combined CQI for the various quantized SINR levels (level 1 through level 6) for a "low," "medium," and "high" antenna correlations such as, for example, may be attributed to the tested reference antennas with correlations of 0.1, 0.5 and 0.9. An example lookup table is shown in FIG. 9. By using a calculated percentage value and locating the appropriate SNR quantization level based on the measured SNR, the estimated antenna correlation may be obtained. For example, 97.5% at level 2 SNR implicates an antenna correlation estimate of 0.3.

Figure 3:
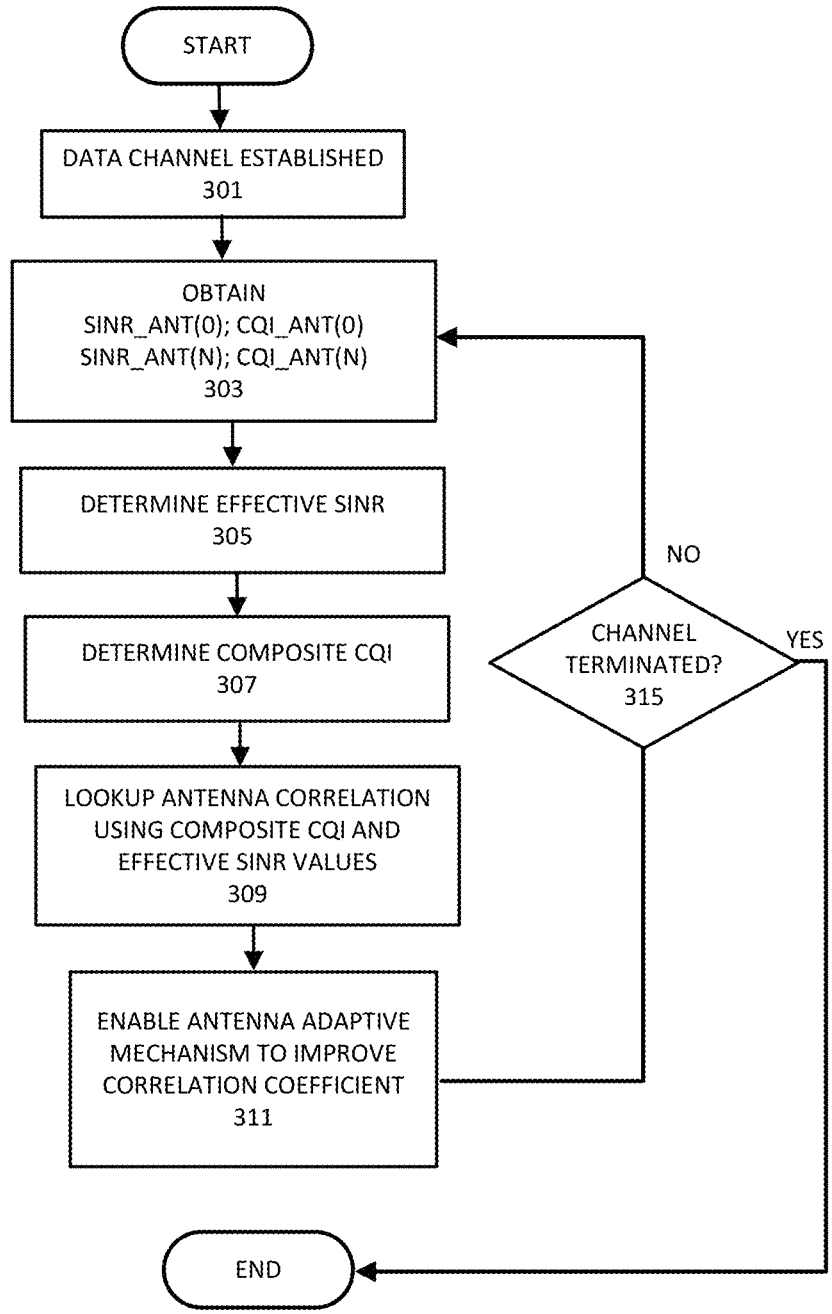
FIG. 3 is a flow chart of an example method of operation of a mobile device in accordance with the embodiment.

The flowchart of FIG. 3 provides further details of a method of operation for determining a MIMO conditioner metric in accordance with the embodiments. The MIMO conditioner metric is used to map the equivalent CQI (composite CQI) to an approximate correlation value with, for example, a resolution of 1/10(0.1). A data channel is established in operation block 301 and in operation block 303, the correlation estimator 109 obtains SNR and CQI information 110 for two streams on any two antennas of antennas 101 that are operating, for example Ant0 and Ant1. In operation block 305, one second averaged samples of SNR-Ant0, SNR-Ant1 are calculated. From the empirical data and statistical correlation estimates, weighting factors are generated for SNR per antenna. The effective SNR may then be calculated as for example, if one MIMO antenna is represented by "Ant0" and another MIMO antenna is represented by "Ant1," then an effective SINR may be calculated as: SINReff=[(wt1×SINR(ant0))+(wt2×SINR(ant1))]; where "wt1" and "wt2" are weighting factors calculated by statistical correlation of SINR(Ant0) to effective CQI (channel quality indicator) and SINR(Ant1) to effective CQI using empirical data collected using reference MIMO antennas with known antenna correlation. One specific example is Effective SNR=(0.94*SNR−Ant0+0.95*SNR−Ant1)/2.

The correlation estimator 109 also calculates one second averaged gain imbalance between the two MIMO antennas such that Gain_Imb=RSSI_Ant0−RSSI_Ant1. In operation block 307, for CQI-CW1 (second channel), all zeroes are averaged in as well to account for the cases when rank 1 (single stream or channel) MIMO is active. Thus CQI-CW0 and CQI-CW1 are calculated. The equivalent CQI-composite is calculated from the CQI-CW0 and CQI-CW1. As mentioned above, FIG. 7 is an extension of the standard table and accommodates rank 2 cases to create a composite CQI value which encodes rank utilization (cases where rank 1 and rank 2 co-exist). Thus the correlation estimator 109 performs a lookup in operation block 309, i.e. CQI-composite=lookup(CQI-CW0, CQI-CW1).

The correlation estimator 109 may then generate the MIMO-conditioner metric as (CQI-composite/CQI-target) *100. The CQI-target for an SNR_quantization level is calculated as the channel quality determined by the antenna with least correlation of 0.1. The MIMO-conditioner metric is then used to find the correlation per FIG. 9.

In FIG. 8, the SNR quantization level (2-dB steps) is checked and the CQI-composite-ref value is checked for each of reference antennas {high, medium, low}. The MIMO-conditioner metric is generated using the CQI-composite-ref-low-correlation (divided by) the CQI-composite-device. The is done because the mobile device most typically has much higher correlation than the CQI-composite-ref for the low-correlation reference antenna. Therefore the value is between 0 and 1. The MIMO conditioner metric is also available for the high correlation and medium correlation reference antenna. The percentage deltas between the values will estimate the approximate antenna correlation of the mobile device. For example, if the CQI-Composite-low-correlation=16.1, the MIMO-conditioners for medium and high correlation antennas are 0.96 (15.4) and 0.82 (11.1), and CQI-Composite-device is at 13.4, then the MIMO-conditioner of the mobile device is at 0.84. This indicates that the antenna correlation is about 0.82. The exact quantification can be facilitated by linear interpolation between the points. This can be used in operation block 311 to provide feedback to the antenna tuning and selection logic 103. The method may continue to loop to operation block 303 and make adjustments as needed until the channel is terminated in decision block 315.

Therefore the MIMO-conditioner metric described herein is the quantification of the approximate antenna correlation of the mobile device. This quantification is related to the modality of the device such as hand-grips of a specific user, dock mode or other detectible conditions that may be detected using various sensors. In addition, the MIMO-conditioner can also be related to the geo-location of the mobile device. Geolocation and the MIMO-conditioner may be aggregated per 100 $m^2$ accuracy. In some embodiments, mobile devices may use location information from the location detection logic 509 and generate geo-tagged MIMO conditioner values at various locations that are stored in a user profile and/or that are sent to a cloud server for storage and aggregation.

Figure 4:
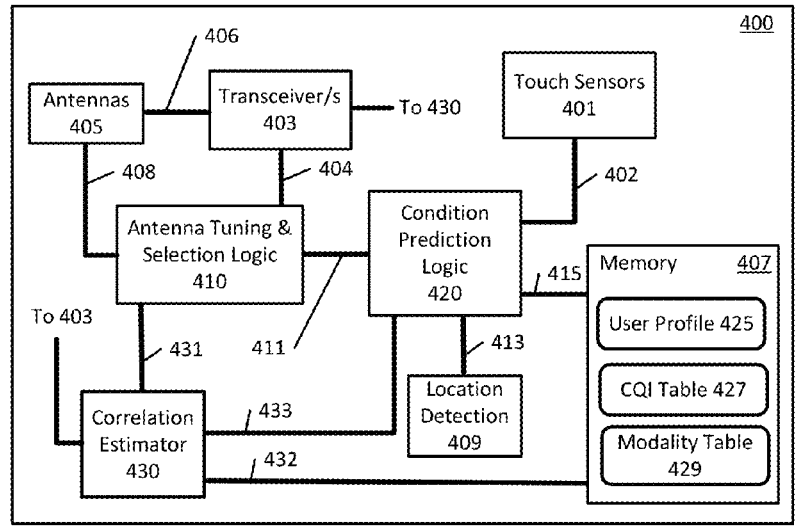
FIG. 4 is a block diagram of an example mobile device having multiple-input/multiple-output antennas (MIMO), a correlation estimator and condition prediction logic in accordance with an embodiment.

In some embodiments, a mobile device may predict the environmental SNR and trigger MIMO antenna adaptation in response to such predictions. Turning to FIG. 4, another example mobile device 400 is illustrated and which is one example apparatus in accordance with the embodiments. The mobile device 400 includes a MIMO antenna system that includes antennas 405 operatively coupled to transceivers 403 by RF coupling 406. The MIMO diversity antennas of antennas 405 are operatively coupled to antenna selection and tuning logic 410 by RF coupling 408, and to the transceivers 403 by RF coupling 404 which provides a switched output of antenna selection and tuning logic 410. In some embodiments, the antennas 405 may include one or more antenna arrays. Each antenna array may be evaluated by a FoM or by signal quality metrics.

The mobile device 400 also includes a set, or an array, of touch sensors 401 that are positioned about the mobile device 400 housing and that are operative to sense the user's fingers and hand when the user grips the mobile device 400 housing. The touch sensors 401 may be, but are not limited to, infrared ("IR") touch sensors, capacitive touch sensors, or combinations thereof. The touch sensors 401 are operatively connected to condition prediction logic 420 by coupling 402 and provide sensor outputs to the condition prediction logic 420 (as inputs). The condition prediction logic 420 may also be operatively coupled to location detection logic 409 by coupling 413 such that the condition prediction logic 420 is operative to receive location data. The condition prediction logic 420 is operatively coupled to memory 407 by read/write connection 415 such that the condition prediction logic 420 may read from and write to a user profile 425 stored in the memory 407. The memory 407 is a non-volatile, non-transitory memory.

The condition prediction logic 420 is operatively coupled to the antenna selection and tuning logic 410 by coupling 411 to send prediction data to the antenna selection and tuning logic 410. For example, the condition prediction logic 420 receives sensor data from the touch sensors 401 and may determine the position of the user's fingers and hand on the mobile device 400 housing. Because the user's hand position may cause impairment to RF reception by the MIMO diversity antennas, the condition prediction logic 420 may predict that a "low" or "high" SNR condition will result and may send a flag ("low" SNR predict flag or "high" SNR predict flag) to the antenna selection and tuning logic 410. The antenna selection and tuning logic 410 may then use the prediction to switch to the appropriate MIMO diversity antenna pair as an initial setting (i.e. prior to determination of the actual SNR condition).

In some embodiments, the condition prediction logic 420 may obtain additional data, in addition to data received from the touch sensors 401, and may create a user profile 425 that includes the obtained data for use in predictions. For example, the condition prediction logic 420 may collect user history for data call and voice calls including time stamps and location data stamps and store this history information in the user profile 425. The condition prediction logic 420 may also obtain SNR measurement data from the antenna selection and tuning logic 410 for these data calls and voice calls. Based on past activities, the condition prediction logic 420 may therefore then predict the SNR based on past SNR measurements associated with these past activities by reading the user profile 425. For example, if the user profile 425 data shows that the user routinely makes a data call at 3:00 pm on a certain day and time, and at a certain location, and the measured SNR indicated selection of a certain MIMO diversity antenna, the condition prediction logic 420 will make this prediction determination and will send the appropriate SNR predict flag to the antenna selection and tuning logic 410. In this way, the MIMO diversity antenna appropriate for the predicted condition can be selected in advance which enhances the mobile device 400 performance and the user's experience with the device.

A correlation estimator 430 is operatively coupled to the memory 407 by a read connection 432 to access and read a CQI table 427 and, in some embodiments, a modality table 429. The condition prediction logic 420 is operatively coupled the correlation estimator by coupling 433 to provide a modality predict flag. The modality predict flag may be used to perform a lookup operation in the modality table 429 for values mapped to given modalities by empirical measurements. The correlation estimator 430 may obtain a predicted antenna correlation by using the CQI table 427, and send a feedback signal 431 to the antenna selection and tuning logic 410. The correlation estimator is also operatively coupled to the transceiver/s 403 to obtain SNR and CQI information for the two MIMO streams as described above with respect to FIG. 1. The correlation estimator 430 operates similar to what was described in FIG. 1 and estimates antenna correlation using values obtained from the transceivers 403 and by using the CQI table 427.

Figure 5:
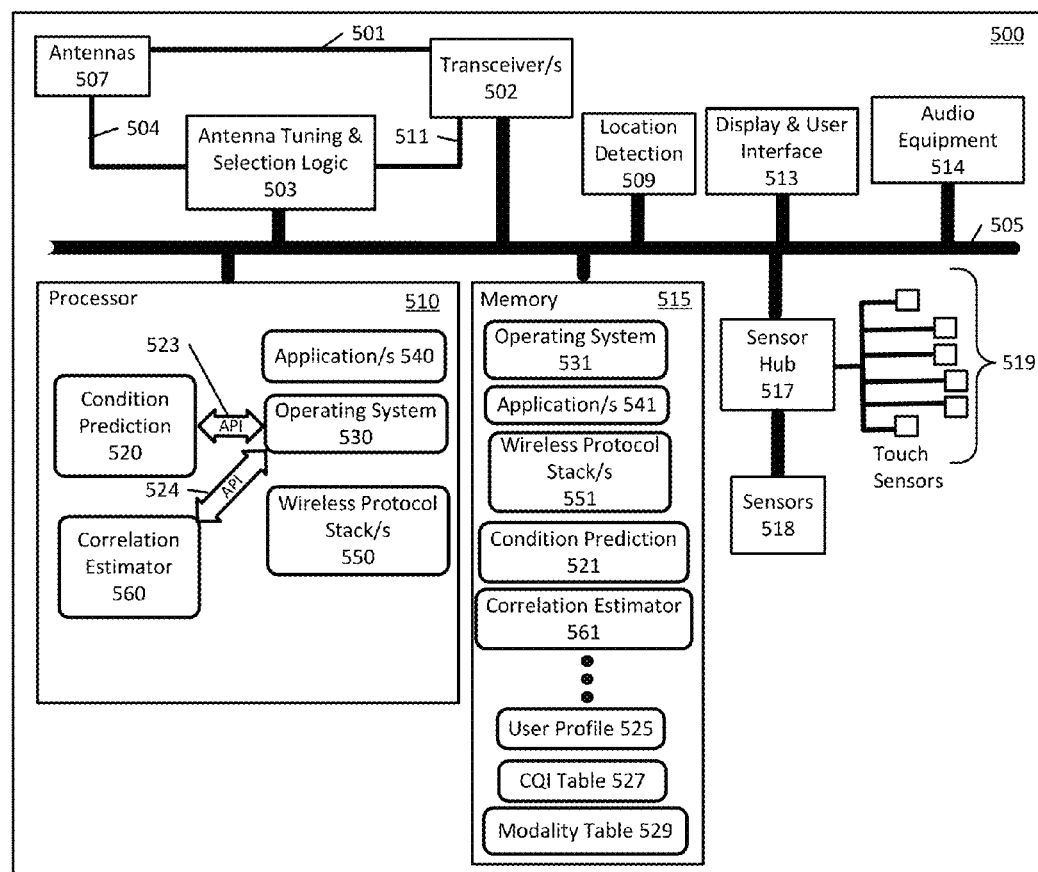
FIG. 5 is a block diagram of an example mobile device having multiple-input/multiple-output antennas (MIMO), a correlation estimator and condition prediction logic in accordance with an embodiment.

In FIG. 5, another example mobile device 500 includes at least one internal communication bus 505 which provides operative coupling between the various components. Each of the various components of the mobile device 500 that are operatively coupled to the communication bus 505 may accordingly send information to, or receive information from, a processor 510. In addition to the processor 510, the mobile device 100 components include, but are not limited to, transceivers 502, antenna selection and tuning logic 503, antennas 507, location detection logic 509 (such as, but not limited to, a GPS receiver), display and user interface 513, audio equipment 514, memory 515, and a sensor hub 517.

The sensor hub 517 is operatively coupled to a plurality of sensors 518 which may include thermal sensors, proximity sensors, accelerometers, gyroscopic sensors, light sensors, etc. The sensor hub 517 is also operatively coupled to a set of touch sensors 519 which are position about the housing of the mobile device 500 and which are operative to sense the user's hand and fingers when placed upon the housing, and to send data to the sensor hub 517. The touch sensors 519 may be optical sensors, capacitive sensors, or combinations of both. The sensor hub 517 is a low power processor that offloads the processor 510 from some tasks such as obtaining data from the sensors 518 and from touch sensors 519. The sensor hub 517 may provide functions while the processor 510 is placed in a sleep mode in order to conserve mobile device 500 battery power. The sensor hub 517 is operative to receive data from the various sensors and to convey the data to the processor 510 over the internal communication bus 505. The data is therefore related to the mobile device 500 modality at any given point in time.

Similar to the mobile device 400 in FIG. 4, the mobile device 500 includes antennas 507 having various MIMO diversity antennas. The antennas 507 are operatively coupled to the transceivers 502 by RF coupling 501. The MIMO diversity antennas of antennas 507 are operatively coupled to antenna selection and tuning logic 503 by RF coupling 504, and to the transceivers 502, by RF coupling 511 which provides the switched output of antenna selection and tuning logic 503. In some embodiments, the antennas 507 may include one or more antenna arrays. Each antenna array may be evaluated by a FoM or by signal quality metrics for the antenna array.

The processor 510 is operative to execute executable instructions (also referred to as "executable code" or "code") stored in memory 515, including operating system executable code 531 to run at least one operating system 530, wireless protocol stack code 551 to run one or more wireless protocol stacks 550, and application (or "user space") executable code 541 to run one or more applications 540. In accordance with the embodiments, the processor 510 is also operative to execute condition prediction code 521 to implement condition prediction logic 520, and to execute correlation estimator code 561 to implement correlation estimator 560.

The condition prediction logic 520 may interact and communicate with the operating system 530 by one or more APIs of a suite of APIs 523 (application programming interfaces) or by other appropriate operative coupling. The condition prediction logic 520 is operative to communicate with the sensor hub 517 to obtain data from the touch sensors 519, the sensors 518 or combinations thereof. This modality data may include information about the position of the mobile device 500, such as whether the mobile device 500 is stationary, in a docking station, placed flatly on a table surface, etc. and other information related to the ambient environment surrounding the mobile device 500. The location detection logic 509 may also be accessed by the condition prediction logic 520 to obtain location information for the mobile device 500. The condition prediction logic 520 may collect and aggregate this data into a user profile 525 stored in memory 515.

The data contained in the user profile 525 is time and date stamped and geotagged using location data from the location detection logic 509. The operation of the condition prediction logic 520 is similar to the condition prediction logic 320 operation described with respect to FIG. 3. That is, the condition prediction logic 520 may obtain data from the touch sensors 519 and from position sensors and other sensors or sensors 518, and may create the user profile 525 that includes the obtained data for use in predictions.

In the example mobile device 500, the condition prediction logic 520 may obtain SNR (or SINR) measurement data from the antenna selection and tuning logic 503 over the internal communication bus 505. The method of operation described with respect to FIG. 4 may therefore also be performed by the example mobile device 500.

The correlation estimator 560 communicates with the operating system 530 using an API 524, and is operative to obtain SNR and CQI measurements form the transceiver/s 502 for at least two MIMO streams in a rank 2 transmission. The correlation estimator 560 may access a CQI table 527 stored in memory 515, and also a modality table 529 in some embodiments. The correlation estimator 560 is operative to determine the MIMO conditioner metric discussed above and estimate the antenna correlation of the mobile device 500 while in any of various modalities. The correlation estimator 560 may provide feedback information to the antenna selection and tuning logic 503 so that adjustments may be made, or different antenna pairs may be selected, to improve the antenna correlation under a given modality.

In some embodiments, the correlation estimator 560 may interact with the condition prediction logic 520 to obtain predicted modality information and may send feedback to the antenna selection and tuning logic 503 based on these predictions by accessing a modality table 529 and a CQI table 527 and obtaining an expected antenna correlation for the predicted modality.

It is to be understood that any of the above described software components (i.e. executable instructions or executable code) in the example mobile device 500 or any of the above described components of example mobile device 100 or mobile device 300 may be implemented as software or firmware (or a combination of software and firmware) executing on one or more processors, or using ASICs (application-specific-integrated-circuits), DSPs (digital signal processors), hardwired circuitry (logic circuitry), state machines, FPGAs (field programmable gate arrays) or combinations thereof. Therefore the mobile devices illustrated in the drawing figures described herein provide examples of a mobile device and are not to be construed as a limitation on the various other possible mobile device implementations that may be used in accordance with the various embodiments.

More particularly, condition prediction logic and/or the correlation estimator may be a single component or may be implemented as any combination of DSPs, ASICs, FPGAs, CPUs running executable instructions, hardwired circuitry, state machines, etc., without limitation. Therefore, as one example, the condition prediction logic may be implemented using an ASIC or an FPGA. In another example, the antenna selection logic may be a combination of RF hardware for implementation of switching between MIMO diversity antennas, and software or firmware executed by a processor that makes the decision regarding when to switch to a given antenna, etc. These example embodiments and other embodiments are contemplated by the present disclosure.

FIG. 6 is an example graph plotting a discovered relationship between gain imbalance and throughput, and between antenna correlation and throughput, versus signal quality as measured by signal-to-noise ratio (SNR) in accordance with various embodiments. It is to be understood that the term SNR as used herein may also refer interchangeably to the term signal-to-noise-plus-interference ratio (SINR). The relationship in the graph of FIG. 6 may be considered as showing a deterministic correlation between gain imbalance and throughput, and between antenna correlation and throughput, versus signal quality as measured by SNR or SINR. The deterministic correlation shown in FIG. 6 was found through empirical data collected using antennas of known antenna correlation. The relationship is considered to be a deterministic correlation, as used herein, in that like empirical data may be collected for any antennas of known antenna correlation to determine an inflection point useful for switching to an antenna pair, or antenna array, having the dominant FoM type for the mobile device's measured environment. The relationship shown if FIG. 6 is therefore encoded in the various described antenna selection and tuning logic for a mobile device for use in making antenna selections as described herein. In mobile device 500 shown in the example embodiment of FIG. 5, the relationship shown in FIG. 6 may be encoded and stored in memory 515 for access and use by antenna selection and tuning logic 503. Alternatively, the FIG. 6 relationship may be encoded into antenna selection and tuning logic 503. The encoding may involve providing knowledge of the inflection point such that a threshold is defined (for example, by providing a threshold setting) for use in antenna selection decisions. The threshold may be defined in software or firmware, or by way of hardwired circuitry or logic circuitry, etc. In the graph of FIG. 6, gain imbalance versus throughput is indicated by diamond shaped data points and antenna correlation coefficient versus throughput is represented by square shaped data points. The vertical axis, or y-axis, represents deterministic correlation and the horizontal axis, or x-axis, represents signal quality as measured by SNR. As can be seen, for an example set of antennas using MIMO diversity antennas, an inflection point occurs at about 6 dB. More particularly, FIG. 6 illustrates that the antenna correlation takes on greater significance with respect to throughput than does gain imbalance for SNR levels above 6 dB. Conversely, the gain imbalance exhibits greater significance with respect to throughput for SNR levels below 6 dB. Therefore, this relationship information (i.e. a deterministic correlation) is made use of by antenna selection logic as described above with respect to the various example embodiments. Therefore, for SNR values above 6 dB the antenna selection logic will select the MIMO antenna pair optimizing for antenna correlation and, for SNR values below 6 dB the antenna selection logic will select the MIMO antenna pair optimizing for gain imbalance.

It is to be understood that, although the present disclosure discusses SNR as a signal quality metric used to determine a dominant FoM for an antenna pair, or for an antenna system, SINR ("signal-to-interference-plus-noise-ratio" or "signal-to-noise-plus-interference ratio") may be also be used interchangeably with SNR. In other words, a relationship may be shown between SINR and FoM values and throughput, and therefore an inflection point in such relationship plots may be used as the threshold, as disclosed and described in detail herein, to make antenna pair or antenna system selection decisions to improve throughput under the given environmental conditions (i.e. SINR conditions). The relationship involves a deterministic correlation between SINR and FoM values and throughput which was discovered by analysis of empirically collected data for antennas of known correlation.

Figure 10:
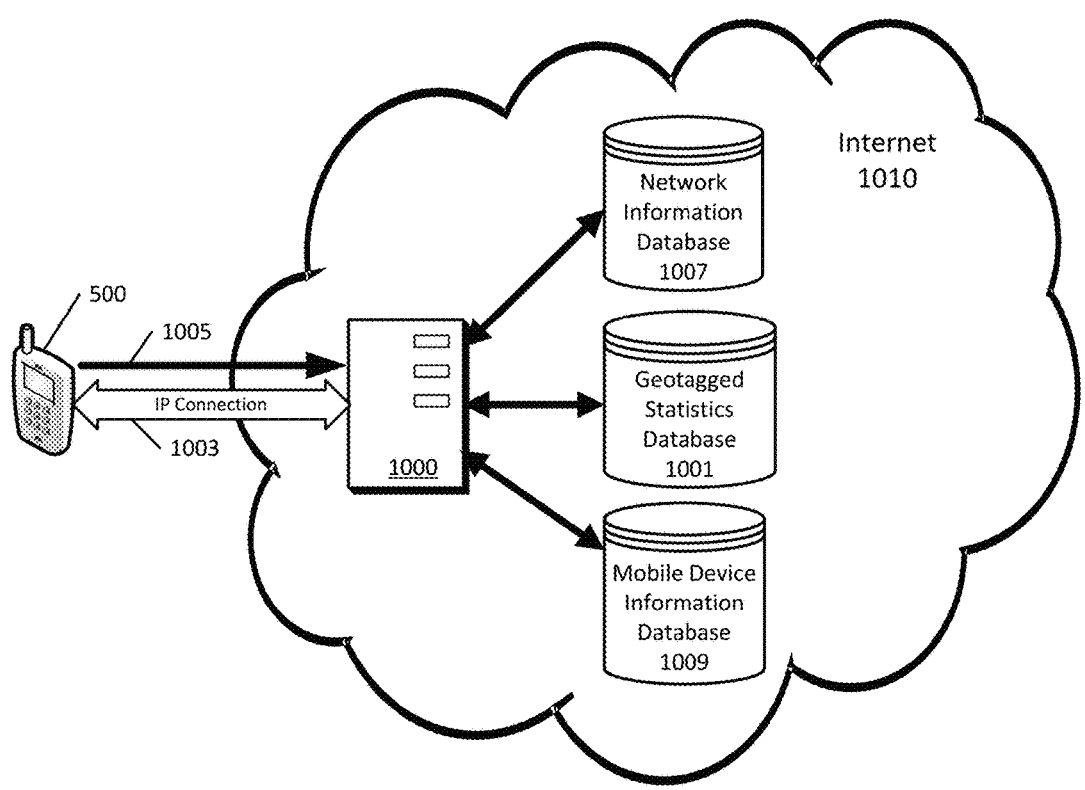
FIG. 10 is an example diagram of a server in communication with a mobile device in accordance with some embodiments.

FIG. 10 illustrates an example embodiment in which a mobile device, such as mobile device 500, may communicate with a server 1000 in order to send information updates 1005. The information updates 1005 may include, among other things, geo-tagged, time stamped network information (for example, measured and/or observed connectivity and performance metrics) and mobile device 500 state information. More particularly, the mobile device 500 may send information updates 1005 that include MIMO conditioner values, or estimated antenna correlation values, that correspond to the geo-location. The mobile device 500 may also send state information, collected from the touch sensors 519 and/or from other sensors and components of mobile device 500 and may report on the mobile device 500 modality such as, for example, the type of hand grip detected, the position of the mobile device 500, whether the mobile device 500 is docked, or other detectible modality information of the mobile device 500 that may be detected using various sensors. This information may be stored in the mobile device information database 1009 in a cloud based user profile in some embodiments. Also, in some embodiments, the mobile device 500 will collect and store modality information in the user profile 525, or may update the modality table 529 from default values. For example, the modality table 529 may have empirical data for a right-handed handgrip, left-handed handgrip, table top placement, docking station, etc., and may store associated SNR, CQI and/or antenna correlation values that may be used to predict antenna correlation when a like modality is detected by the mobile device 500 sensors. The user profile 525 may also include geo-tagged modality information, such that, when the mobile device 500 enters a given geo-location, the user profile 529 indicates that the mobile device 500 will be used in a certain way (i.e. in a certain modality). The correlation estimator 560 may therefore send a signal to the antenna selection and tuning logic 503 to anticipate this modality and make antenna adjustments in advance. In alternative embodiments, this determination may be performed in the cloud by server 1000 using the mobile device information database 1009 and/or the geotagged statistics database 1001. For example, if the mobile device 500 is regularly reporting its location to the server 1000, the server 1000 may anticipate that the mobile device 500 will enter a certain location in which the geotagged statistics database 1001 indicates that mobile devices will encounter a given antenna correlation. The server 1000 may send antenna adjustment information to the mobile device 500 in an effort to help the mobile device 500 adjust its antennas accordingly to obtain better throughput.

In other words, collected antenna correlation values may be geo-tagged and also tied to given mobile device modalities such that the mobile device 500 may anticipate and adjust for expected throughput reductions based on past historical data of antenna correlations occurring at given locations and for given modalities (when such information is available). The mobile device 500 may do this independently using the modality table 529 and user profile 525, or may obtain assistance from the server 1000 and the geotagged statistics database 1001. That is, the geotagged statistics database 1001 includes an aggregation of collected antenna correlation values (that may also be related to mobile device modalities), collected from various reporting mobile devices, which may be used to predict antenna correlation (and therefore predict the level of throughput that may be obtained) as a mobile device moves through various geo-locations.

The mobile device 500 may establish an IP connection 1003 through either its subscribed wide area network, through a wireless local area network, or etc. The mobile device 500 may be only one of various mobile devices that send information updates 1005 to the server 1000. Therefore, the server 1000 may maintain, or may be integrated with, an aggregated geotagged statistics database 1001, a network information database 1007, and a mobile device information database 1009. The mobile device information database 1005 may contain information about the antenna types employed in a given mobile device and, in some embodiments, this information may be reported to the server 1000 by the mobile devices in an information update 1005. The geotagged statistics database 1001 may contain MIMO conditioner values or antenna correlation values that have been collected from various reporting mobile devices. This information may be collected and aggregated by the server 1000 such that antenna correlation for any mobile device entering a given geo-location may be predicted by referencing the statistics of the geotagged statistics database 1001. In one embodiment, the server 1000 is a cloud-based server that resides in the Internet 1010 along with the various databases. The databases may also be cloud based, and may be distributed among several physical locations.

The aggregated geotagged statistics database 1001 is used by the server 1000 to create various mappings of network performance metrics to geographic locations and to infer network topographies for such regions including inferring specific network cell coverage in given regions for various heterogeneous networks. Using these mappings and inferred topographies, the server 1000 is operative to suggest connectivity and/or other services to mobile devices in order to optimize data throughput, battery life, and other performance characteristics of the mobile devices. More particularly, by receiving information updates 1005 from the mobile device 500 and from other mobile devices, the server 1000 is operative to construct and maintain the geotagged statistics database 1001 for the purpose of improving the connectivity and/or data throughput of mobile devices as the mobile devices move through various geographic locations having different levels of RF coverage and varying levels of service. Therefore the server 1000 is operative to predict antenna correlation for a given mobile device based on statistics data and to suggest antenna adjustments to subscribed mobile devices in order to improve antenna correlation and to help the mobile device obtain better throughput.

The various embodiments have described methods and apparatuses for estimation of antenna correlation for a mobile device. It is to be understood that various applications of the antenna correlation estimation described herein may be used to improve performance of a mobile device and that these various applications are contemplated by, and are within the scope of, the present disclosure. Therefore, while various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method, comprising:
    obtaining, from a transceiver, a respective channel quality indicator (CQI) measurement for each of a first antenna and a second antenna in a multiple-input, multiple-output (MIMO) antenna system;
    determining, using a correlation estimator, a composite CQI, for the first antenna and the second antenna, from the respective CQI measurements; and
    estimating, using the composite CQI, an antenna correlation for the first antenna and the second antenna.

2. The method of claim 1, further comprising performing, using a CQI table, a table lookup operation, wherein:
    the CQI table maps the composite CQI comprising to coding rates; and
    the composite CQI includes at least a first MIMO stream and a second MIMO stream.

3. The method of claim 2, further comprising:
    obtaining a respective signal-to-noise ratio (SNR) measurement for each of the first antenna and the second antenna; and using the respective SNR measurements as an input to the estimating the antenna correlation for the first antenna and the second antenna.

4. The method of claim 1, further comprising providing, based on the estimated antenna correlation, feedback to antenna tuning and selection logic.

5. The method of claim 1, further comprising switching, in response to the antenna correlation estimate for the first antenna and the second antenna, from the first antenna and the second antenna to a third antenna and a fourth antenna.

6. The method of claim 1, further comprising, in response to the antenna correlation estimate for the first antenna and the second antenna:
deactivating the second antenna; and
activating a third antenna to pair the third antenna with the first antenna.

7. An apparatus, comprising:
at least one transceiver;
a multi-input multi-output (MIMO) antenna system; and
a correlation estimator coupled to the at least one transceiver, wherein the correlation estimator is configured to:
obtain a respective channel quality indicator (CQI) measurement for each of a first antenna and a second antenna in the MIMO antenna system;
determine a composite CQI, for the first antenna and the second antenna, from the respective CQI measurements; and
estimate, using the composite CQI, an antenna correlation for the first antenna and second antenna.

8. The apparatus of claim 7, further comprising non-volatile and non-transitory memory coupled to the correlation estimator and storing a CQI table mapping composite CQI to coding rates, wherein:
the composite CQI comprises comprising at least a first MIMO stream and a second MIMO stream; and
the correlation estimator is further configured to obtain the antenna correlation estimate by performing, using the composite CQI, a table lookup operation using the CQI table.

9. The apparatus of claim 8, wherein the correlation estimator is further configured to:
obtain a respective signal-to-noise ratio (SNR) measurement for each of the first antenna and the second antenna; and
estimate, using the composite CQI and the respective SNR measurements, the antenna correlation for the first antenna and second antenna.

10. The apparatus of claim 7, further comprising:
antenna tuning and selection logic coupled to the MIMO antenna system, to the at least one transceiver, and to the correlation estimator, wherein:
the correlation estimator is further configured to provide feedback to the antenna tuning and selection logic; and
the feedback is based on the estimated antenna correlation.

11. The apparatus of claim 10, wherein the antenna tuning and selection logic is configured to switch, in response to the feedback signal, from the first antenna and the second antenna to a third antenna and a fourth antenna.

12. The apparatus of claim 10, wherein the antenna tuning and selection logic is configured to, in response to the feedback:
deactivate the second antenna; and
activate a third antenna to pair the third antenna with the first antenna.

13. A mobile device, comprising:
at least one transceiver;
a multiple-input, multiple-output (MIMO) antenna system coupled to the at least one transceiver;
a channel quality indicator (CQI) table stored in non-volatile and non-transitory memory, wherein:
the CQI table maps a composite CQI to coding rates, and
the composite CQI includes at least a first MIMO stream and a second MIMO stream;
a correlation estimator coupled to the at least one transceiver and to the memory, wherein the correlation estimator is configured to:
obtain a respective channel quality indicator (CQI) measurement for each of a first antenna and a second antenna of the MIMO antenna system;
determine a composite CQI, for the first antenna and the second antenna, from the respective CQI measurements; and
estimate, using the composite CQI, the antenna correlation for the first antenna and the second antenna by performing a table lookup operation in the CQI table.

14. A non-transitory computer-readable medium, comprising:
processor-executable instructions stored thereon configured to cause a processor to:
obtain, from a transceiver, a respective channel quality indicator (CQI) measurement for each of a first antenna and a second antenna in a multiple-input, multiple-output (MIMO) antenna system;
determine a composite CQI, for the first antenna and the second antenna, from the respective CQI measurements; and
estimate, using the composite CQI, an antenna correlation for the first antenna and the second antenna.

15. The non-transitory computer-readable medium of claim 14, wherein the processor-executable instructions further include instructions configured to cause the processor to perform, using a CQI table, a table lookup operation, wherein:
the CQI table maps the composite CQI comprising to coding rates; and
the composite CQI includes at least a first MIMO stream and a second MIMO stream.

16. The non-transitory computer-readable medium of claim 15, wherein the processor-executable instructions further include instructions configured to cause the processor to:
obtain a respective signal-to-noise ratio (SNR) measurement for each of the first antenna and the second antenna; and
use the respective SNR measurements as an input to the estimating the antenna correlation for the first antenna and the second antenna.

17. The non-transitory computer-readable medium of claim 14, wherein the processor-executable instructions further include instructions configured to cause the processor to provide, based on the estimated antenna correlation, feedback to antenna tuning and selection logic.

18. The non-transitory computer-readable medium of claim 14, wherein the processor-executable instructions further include instructions configured to cause the processor to switch, in response to the antenna correlation estimate for the first antenna and the second antenna, from the first antenna and the second antenna to a third antenna and a fourth antenna.

19. The non-transitory computer-readable medium of claim 14, wherein the processor-executable instructions further include instructions configured to cause the processor to, in response to the antenna correlation estimate for the first antenna and the second antenna:
   deactivate the second antenna; and
   activate a third antenna to pair the third antenna with the first antenna.

\* \* \* \* \*